United States Patent
Rea et al.

(10) Patent No.: US 12,188,813 B2
(45) Date of Patent: Jan. 7, 2025

(54) SYSTEM AND METHOD FOR EVALUATING THE EFFICIENCY OF CIRCADIAN-EFFECTIVE LUMINAIRES

(71) Applicant: Icahn School of Medicine at Mount Sinai, New York, NY (US)

(72) Inventors: Mark S. Rea, New York, NY (US); Mariana Figueiro, New York, NY (US); Allison Lyn Thayer, New York, NY (US); Charles Jarboe, New York, NY (US); Andrew Bierman, New York, NY (US)

(73) Assignee: Icahn School of Medicine at Mount Sinai, New York, NY (US)

( * ) Notice: Subject to any disclaimer, the term of this patent is extended or adjusted under 35 U.S.C. 154(b) by 0 days.

(21) Appl. No.: 18/204,592

(22) Filed: Jun. 1, 2023

(65) Prior Publication Data
US 2023/0392979 A1 Dec. 7, 2023

Related U.S. Application Data

(60) Provisional application No. 63/347,812, filed on Jun. 1, 2022.

(51) Int. Cl.
*G01J 1/42* (2006.01)

(52) U.S. Cl.
CPC ......... *G01J 1/42* (2013.01); *G01J 2001/4242* (2013.01)

(58) Field of Classification Search
CPC ........................................................ G01J 1/42
See application file for complete search history.

(56) References Cited

U.S. PATENT DOCUMENTS

| | | | |
|---|---|---|---|
| 10,299,355 B2 * | 5/2019 | Rajagopalan | H05B 47/19 |
| 10,609,798 B1 * | 3/2020 | Maa | H01L 25/0753 |
| 2018/0110105 A1 * | 4/2018 | Guzik | H05B 47/19 |

* cited by examiner

*Primary Examiner* — Georgia Y Epps
*Assistant Examiner* — Don J Williams
(74) *Attorney, Agent, or Firm* — Leason Ellis LLP

(57) ABSTRACT

A system and method evaluate the efficiency of circadian-effective luminaires. Such circadian-effective luminaires affect the master biological clock in the brain, which regulates the daily timings of behavioral activities and physiological functions. Disruption of circadian rhythms can lead to poor performance and poor health, while consistent exposure to bright days and dim nights is necessary for circadian entrainment, and thus for good sleep and good health. The system and method provide a standard test for assessing the efficiency of luminaires for providing circadian-effective light to building occupants. The system and method measure and quantify luminaire efficiency based on the electrical watts needed, termed SOWatt, to reach a circadian stimulus (CS) criterion of 0.3 at the eyes of a standard observer (SO). The system and method can be applied to ceiling mounted, accent, and table-top luminaires.

18 Claims, 8 Drawing Sheets

Standard rules

FIG. 4B 402

Ceiling – Recessed

FIG. 4C 404

Pendant

FIG. 4D 406

Wall sconce – Direct/indirect

FIG. 4E 408

Wall sconce – Facing observer

FIG. 4F 410

Desktop – On-axis (a), Off-axis (b)

FIG. 4G 412

Wall wash

FIG. 5

| Luminaire | Image | Candela plot | Lamp | Wattage | Lm Flux (lumens) | Electrical to radiant factor (lumens/watt) =F/E | CCT | Illuminance to reach 0.3 fc (lux) | Orientation | Vertical illuminance (lux) | Geometrical factor (m^-2) =F/K | Watts needed =(E*J)/K |
|---|---|---|---|---|---|---|---|---|---|---|---|---|
| 1 | Ceiling - Direct batwing distribution 2x4 LED | | | LED | 37.4 | 4232 | 113 | 5000 K | 292 | Short | 74.1 | 57.1 | 147 |
| | | | | | | | | | | Long | 101 | 41.9 | 108 |
| 2 | | | | | | | | 3000 K | 350 | Short | 74.1 | 57.1 | 177 |
| | | | | | | | | | | Long | 101 | 41.9 | 130 |
| 3 | Ceiling - Direct batwing distribution 2x4 Fluorescent | | | Fluorescent | 65.5 | 4124 | 63.0 | 5000 K | 245 | Short | 76.4 | 54.0 | 210 |
| | | | | | | | | | | Long | 83.0 | 49.7 | 193 |

SYSTEM AND METHOD FOR EVALUATING THE EFFICIENCY OF CIRCADIAN-EFFECTIVE LUMINAIRES

CROSS-REFERENCE TO RELATED APPLICATION

This application claims priority to U.S. provisional application No. 63/347,812, filed Jun. 1, 2022, which is incorporated herein by reference in its entirety.

FIELD OF THE DISCLOSURE

The present disclosure relates generally to evaluating luminaires, and, more particularly, to a system and method configured to evaluate the efficiency of circadian-effective luminaires.

BACKGROUND OF THE DISCLOSURE

Figure 1:
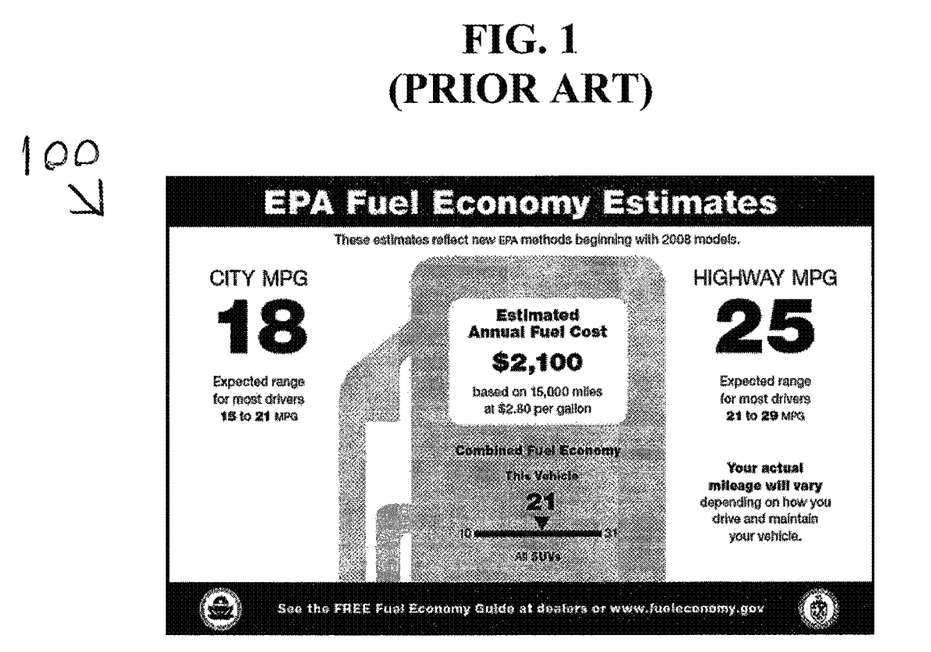
FIG. 1 is an EPA fuel efficiency label in the prior art.

In 1973, the United States Environmental Protection Agency (USEPA) began publishing fuel economy data for various vehicles on the road using a pre-existing emission-level testing procedure. A test vehicle is operated on a laboratory dynamometer for a simulated 7.5-mile city drive. Exhaust emissions are measured, from which fuel efficiency is calculated. In 1977 manufacturers were required to label all of their vehicles with the USEPA fuel efficiency results for that vehicle type as well as the range of fuel efficiency for similar vehicles of a defined "car line," such as compact, sedan, light-duty truck, and so on. As is well understood by the public, these laboratory findings only characterize the potential fuel efficiency of a vehicle and not necessarily the fuel efficiency exhibited by a particular driver of that vehicle type. The way in which the vehicle is operated affects actual fuel efficiency, and in particular, the proportion of urban and highway driving affects fuel efficiency. Other factors such as tire inflation and fuel type will also affect a vehicle's actual fuel efficiency. Importantly, however, the fuel economy estimates provided by USEPA will generally differentiate vehicle types, for example, in general, SUVs are less efficient than compact cars. FIG. 1 is an example of the EPA fuel-efficiency label 100 required for all cars sold in the United States starting in 2008.

In the field of lighting, light is not just for vision anymore. By focusing on the role that light has on visibility, the industry has created a long tradition for providing lighting products and applications for human vision in outdoor, commercial, and industrial settings. Because lighting also affects our non-visual circadian system, it seems incumbent on the lighting industry to begin to provide lighting products and applications for human health. Recognizing that this social obligation is new for the lighting industry, it is necessary that new products and applications follow. To do so, new enabling tools are needed for lighting professionals.

There is a great deal of interest in healthy lighting, or more specifically lighting that supports circadian entrainment such that a person consistently sleeps at night and is wakeful and productive during the day. To be entrained to this natural 24-hour cycle, the eyes (and only the eyes) need to be consistently exposed to bright days, and dim or dark nights. It is known that building interiors do not generally provide circadian-effective bright light during the day and, due in large part to increased use of self-luminous devices, building interiors do not necessarily provide circadian-ineffective dim light at night. This leads to circadian disruption which, in turn, results in poor sleep for people at night and sleepiness during the day.

Much like where a person drives largely determines fuel efficiency, such as city vs. highway, when a person's eyes are exposed to bright and to dim light largely determines whether the benefits of circadian-effective light can be achieved. In a manner analogous to tire inflation and fuel type, several characteristics of light in addition to timing affect circadian entrainment, specifically, the amount, spectrum, distribution, and duration of light exposure. Empirical research and mathematical modeling provide the foundations for defining circadian-effective and circadian-ineffective lighting. Based largely upon that research and modeling, Underwriters Laboratory's (UL) Design Guideline for Promoting Circadian Entrainment with Light for Day-Active People, Design Guideline 24480 (UL 24480) was published to provide lighting design guidelines for achieving circadian entrainment for day-active and night-inactive building occupants.

The UL 24480 lighting design guideline is, as the title suggests, application-based, meaning that implementation of circadian-effective lighting requires specific information about the spaces being occupied. In addition to the luminaires, wall reflectance values, workstation partition heights, and directions of view will affect the amount and distribution of circadian-effective light reaching a person's eyes. Therefore, there is an almost infinite number of possible circadian-effective light outcomes, but to be effective they should have one thing in common; that is, to deliver bright circadian-effective light during the day to the occupant' eyes. Most designers and architects who are interested in delivering circadian-effective light understand this point. This means that to have circadian-effective lighting in a room during the day, some designers and architects understand that finished surfaces should be highly reflective, room partitions should be low, and the distribution emitted by the luminaire should provide illumination to the vertical plane at the eyes, not simply on the horizontal plane at the work surface.

SUMMARY OF THE DISCLOSURE

According to an embodiment consistent with the present disclosure, a system and method are configured to evaluate the efficiency of circadian-effective luminaires.

To address the needs in the prior art, and much like USEPA rating of vehicle fuel efficiency, the system and method provide a test procedure for rating luminaires in terms of the potential electric power (in watts) that would be needed by the luminaire to provide a criterion level of circadian-effective lighting in buildings.

A standard testing procedure is used by the system and method for luminaires that could be used to deliver circadian-effective light to a building occupant's eyes. These measurements, of course, do not guarantee that circadian-effective lighting will actually be achieved in a building. Importantly, however, keeping all other architectural factors constant, the proposed circadian-effective measurements should predict the relative performance of different luminaires in most architectural spaces. Naturally, some types of luminaires will be more efficient than others, but the reason for selecting a luminaire type would rarely depend solely upon its effectiveness for delivering circadian-effective light to building occupants. Rather, cost and aesthetics can play a significant role in luminaire selection, just as it is with selecting a motor vehicle. So, just like the USEPA fuel efficiency ratings are to be compared within a given "car line" (e.g., compact, sedan, light-duty truck), the present system and method provide that the standard testing procedure results for a given luminaire are to be reported along with others within a given "luminaire line" (e.g., down-light, direct-indirect, wall-washing). Nevertheless, the system and method makes it possible to compare circadian effectiveness both within and across "luminaire lines" because an absolute power (watts) value is reported.

Accordingly, the system and method provide a standard testing procedure for assessing luminaires that can be actualized both virtually and in reality. Luminaires of all types can be compared in terms of their ability to provide a criterion circadian stimulus (CS=0.3). Since there are many types of luminaires, each aimed at addressing different design objectives, "luminaire lines" are conceptualized so that luminaires within a particular "line" could be more easily compared. The measure used to make these comparisons is the electrical watts required for the luminaire to reach the circadian stimulus criterion CS=0.3 for the standard observer, or SOWatt for short. As electric utilities become increasingly interested in the non-energy benefits of lighting, the SOWatt metric provides a convenient and useful metric for supporting and promoting energy-efficient circadian-effective lighting.

In an embodiment, a method comprises receiving configuration data for a luminaire, applying a predetermined rule to the configuration data by a computer-based processor, determining an effective lighting value of the luminaire using the computer-based processor, and outputting the effective lighting value. The effective lighting value can be a circadian-effective lighting wattage of the luminaire. The circadian-effective lighting wattage (SOWatt) can induce a circadian stimulus (CS) at the eyes of a standard observer (SO) relative to the luminaire. The CS can equal 0.3. The outputting of the effective lighting value can include displaying the effective lighting value on a display device. The display of the effective lighting value can include displaying a graphic listing the effective lighting value. Alternatively, the outputting of the effective lighting value can include printing a graphic label listing the effective lighting value. The luminaire can be selected from the group consisting of: a ceiling mounted luminaire, an accent luminaire, and a table-top luminaire.

In another embodiment, a method comprises receiving configuration data for a luminaire, applying a predetermined rule to the configuration data by a computer-based processor, determining a circadian-effective lighting wattage (SOWatt) of the luminaire using the computer-based processor, wherein the circadian-effective lighting wattage induces a circadian stimulus (CS) during daytime at the eyes of a standard observer (SO) relative to the luminaire, and displaying the circadian-effective lighting wattage. The CS can equal 0.3. The displaying of the circadian-effective lighting wattage can include displaying a graphic on a display device, wherein the graphic lists the circadian-effective lighting wattage. Alternatively, the displaying of the circadian-effective lighting wattage can include printing a graphic label listing the circadian-effective lighting wattage. The luminaire can be selected from the group consisting of: a ceiling mounted luminaire, an accent luminaire, and a table-top luminaire.

In a further embodiment, a system comprises an interface and a computer-based processor. The interface is configured to receive configuration data for a luminaire. The computer-based processor has code therein configured to apply a predetermined rule to the configuration data and to determine an effective lighting value of the luminaire. The interface is also configured to output the effective lighting value. The effective lighting value can be a circadian-effective lighting wattage of the luminaire. The circadian-effective lighting wattage (SOWatt) can induce a circadian stimulus (CS) at the eyes of a standard observer (SO) relative to the luminaire. The CS can equal 0.3. The interface can include a display device configured to display the effective lighting value. The interface can display a graphic listing the effective lighting value. Alternatively, the interface can include a printer configured to print a graphic label listing the effective lighting value.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

It is noted that the drawings are illustrative and are not necessarily to scale.

DETAILED DESCRIPTION OF CERTAIN EMBODIMENTS OF THE DISCLOSURE

Example embodiments consistent with the teachings included in the present disclosure are directed to a system and method configured to evaluate the efficiency of circadian-effective luminaires.

Figure 2:
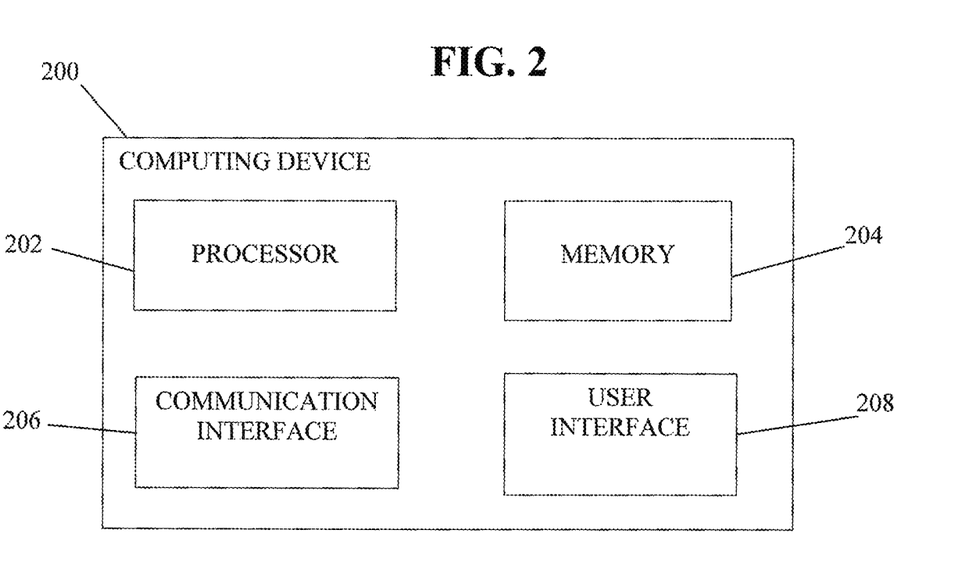
FIG. 2 is a schematic of the system, according to an embodiment.

FIG. 2 illustrates a schematic of a computing device 200 of the system, which includes a processor 202 having code therein, a memory 204, and a communication interface 206. Optionally, the computing device 200 can include a user interface 208. The processor 202, the memory 204, the communication interface 206, and the user interface 208 can be operatively connected to each other via any known connections, such as a system bus, a network, etc.

It is to be understood that the computing device 200 can include different components. Alternatively, the computing device 200 can include additional components. In another alternative embodiment, some or all of the functions of a given component can instead be carried out by one or more different components. The computing device 200 can be implemented by a virtual computing device. Alternatively, the computing device 200 can be implemented by one or more computing resources in a cloud computing environment. Additionally, the computing device 200 can be implemented by a plurality of any known computing devices.

The processor 202 can include one or more general-purpose processors. Alternatively, the processor 202 can include one or more special-purpose processors. The processor 202 can be integrated in whole or in part with the memory 204, the communication interface 206, and the user interface 208. In another alternative embodiment, the processor 202 can be implemented by any known hardware-based processing device such as a controller, an integrated circuit, a microchip, a central processing unit (CPU), a microprocessor, a system on a chip (SoC), a field-programmable gate array (FPGA), or an application-specific integrated circuit (ASIC). In addition, the processor 202 can include a plurality of processing elements configured to perform parallel processing. In a further alternative embodiment, the processor 202 can include a plurality of nodes or artificial neurons configured as an artificial neural network. The processor 202 can be configured to implement any known artificial neural network, including a convolutional neural network (CNN).

The memory 204 can be implemented as a non-transitory computer-readable storage medium such as a hard drive, a solid-state drive, an erasable programmable read-only memory (EPROM), a universal serial bus (USB) storage device, a floppy disk, a compact disc read-only memory (CD-ROM) disk, a digital versatile disc (DVD), cloud-based storage, or any known non-volatile storage.

The code of the processor 202 can be stored in a memory internal to the processor 202. The code can be instructions implemented in hardware. Alternatively, the code can be instructions implemented in software. The instructions can be machine-language instructions executable by the processor 202 to cause the computing device 200 to perform the functions of the computing device 200 described herein. Alternatively, the instructions can include script instructions executable by a script interpreter configured to cause the processor 202 and computing device 200 to execute the instructions specified in the script instructions. In another alternative embodiment, the instructions are executable by the processor 202 to cause the computing device 200 to execute an artificial neural network.

The memory 204 can store data in any known format, such as databases, data structures, data lakes, or network parameters of a neural network. The data can be stored in a table, a flat file, data in a filesystem, a heap file, a B+ tree, a hash table, or a hash bucket. The memory 204 can be implemented by any known memory, including random access memory (RAM), cache memory, register memory, or any other known memory device configured to store instructions or data for rapid access by the processor 202, including storage of instructions during execution.

The communication interface 206 can be any known device configured to perform the communication interface functions of the computing device 200 described herein. The communication interface 206 can implement wired communication between the computing device 200 and another entity. Alternatively, the communication interface 206 can implement wireless communication between the computing device 200 and another entity. The communication interface 206 can be implemented by an Ethernet, Wi-Fi, Bluetooth, or USB interface. The communication interface 206 can transmit and receive data over a network and to other devices using any known communication link or communication protocol.

The user interface 208 can be any known device configured to perform user input and output functions. The user interface 208 can be configured to receive an input from a user. Alternatively, the user interface 208 can be configured to output information to the user. The user interface 208 can be a computer monitor, a television, a loudspeaker, a computer speaker, or any other known device operatively connected to the computing device 200 and configured to output information to the user. A user input can be received through the user interface 208 implementing a keyboard, a mouse, or any other known device operatively connected to the computing device 200 to input information from the user. Alternatively, the user interface 208 can be implemented by any known touchscreen. The computing device 200 can include a server, a personal computer, a laptop, a smartphone, or a tablet.

Figure 3:
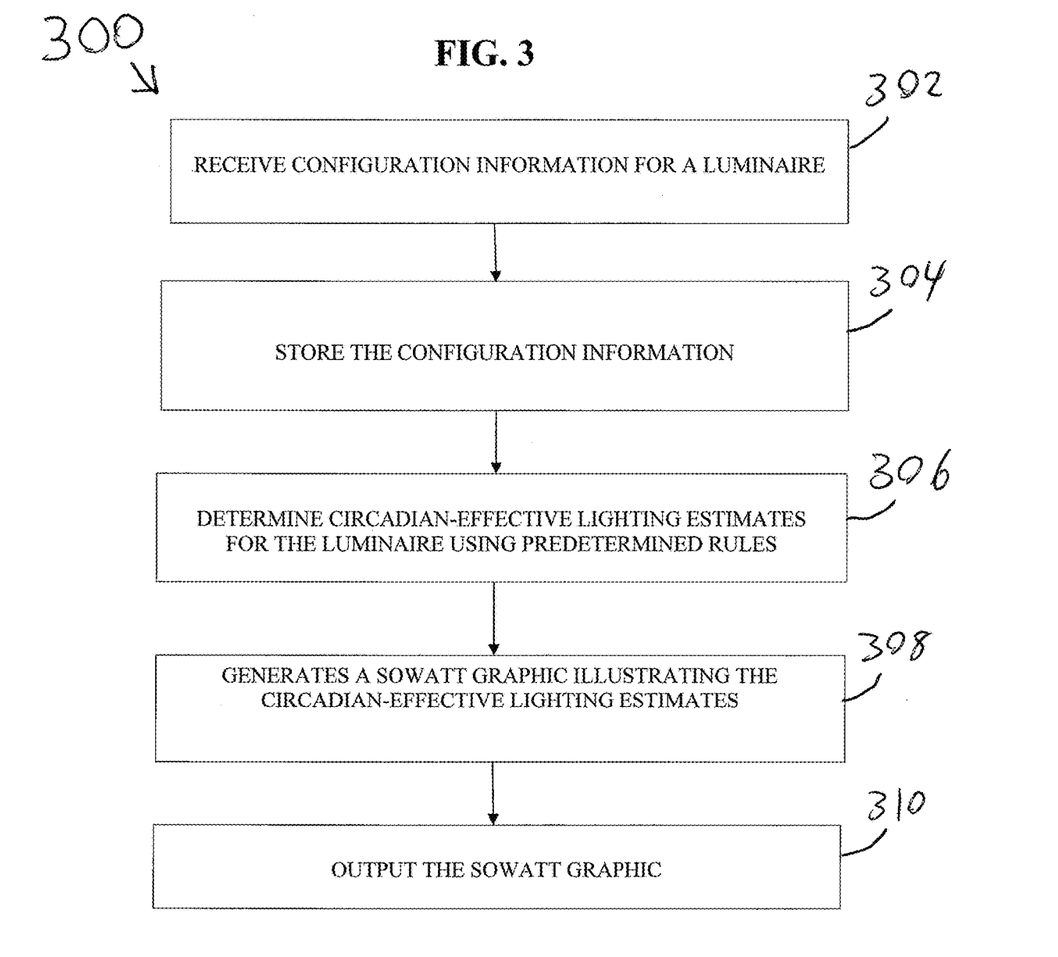
FIG. 3 is a flowchart of the method of operation of the system of FIG. 2.

As shown in FIG. 3 in conjunction with FIG. 2, the method 300 includes the steps of receiving configuration data as configuration information for a given luminaire at the computing device 200 through the communication interface 206 or the user interface 208 in step 302, and the computing device 200 stores the configuration information in the memory 204 in step 304. Using predetermined rules, as described below, the processor 202 determines circadian-effective lighting estimates for the given luminaire in step 306, and the processor 202 generates a SOWatt graphic illustrating the circadian-effective lighting estimates in step 308. The computing device 200 then outputs the SOWatt graphic in step 310 through the communication interface 206 or the user interface 208. For example, the communication interface 206 or the user interface 208 can include a display, and the SOWatt graphic can be output on the display. Alternatively, the communication interface 206 or the user interface 208 can include a printer, and the SOWatt graphic can be printed as a label using the printer.

To determine the potential for any luminaire providing circadian-effective lighting, a standard test configuration was created. This standard configuration includes a standard observer seated at a table. Like the USEPA test for fuel economy, the standard test configuration and standard observer simulates common and important elements of a space (e.g., inter-reflectance from the surfaces of ceilings, walls, floors, and furniture) that could affect the electrical power needed to reach a criterion circadian stimulus (CS) level. Table 1 and FIGS. 4A-4G define the standard test configuration and the location of the standard observer. Table 1 includes a list of predetermined rules for standard configuration along with variables that are dependent on the luminaire line.

TABLE 1

| Component | Factor | Measurement |
|---|---|---|
| Constants | | |
| Room | Room depth | 16'-0" |
| | Ceiling height | 8'-0" (or 10'-0"$^a$) |
| | Ceiling reflectance | 80% |
| | Front wall reflectance | 50% |
| | Other wall reflectance | 0% |
| | Floor reflectance | 20% |
| Luminaire | Center of luminaire distance to wall | 4'-0" |
| | Luminaire plane height above floor | 8'-0" |
| | Luminaire length shall not exceed | 8'-0" |
| | Luminaire tested in two orientations with 90° difference | Long vs short |
| Standard observer | Standard observer distance offset from center of luminaire | 8'-0" |
| | Standard observer height above floor | 4'-0" |
| | Horizontal illuminance ($E_H$) point height above floor | 2'-6" |
| Table | Length | 4'-0" |
| | Width | 4'-0" |
| | Height | 2'-6" |
| | Reflectance | 50% |
| | Table location compared to standard observer location | Fixed |

TABLE 1-continued

| Component | Factor | Measurement |
|---|---|---|
| | Variables | |
| Direct luminaire | Luminaires are limited in length to fit within the room dimensions | 8'-0" |
| Pendant | Ceiling height | 10'-0" |
| | Center of luminaire distance from floor | 8'-0" |
| | Luminaires are limited in length to fit within the room dimensions | 8'-0" |
| Wall wash | Center of luminaire distance to wall unless otherwise specified by the manufacturer | 2'-0" |
| | Luminaire plane height above floor | 8'-0" |
| Wall sconce | Center of luminaire distance from floor unless otherwise specified by the manufacturer | 4'-0" |
| Desktop: On-axis | Center of luminaire distance to observer | 2'-0" |
| | Center of luminaire height above floor | 4'-0" |
| Desktop: Off-axis | Center of luminaire distance to observer | 2'-0" |
| | Center of luminaire offset from center | 1'-0" |
| | Center of luminaire height above floor | 4'-0" |

Note:
<sup>a</sup>The 10' ceiling height applies only when a pendant is used in the design (see Variables).

Figure 4A:
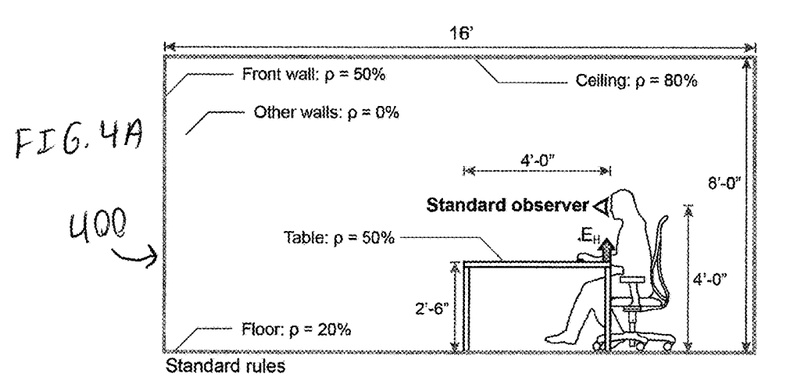
FIGS. 4A-4G are standard configuration rules and luminaire-dependent variables for the major luminaire lines.
Figure 4B:
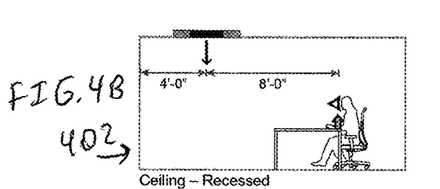
Figure 4C:
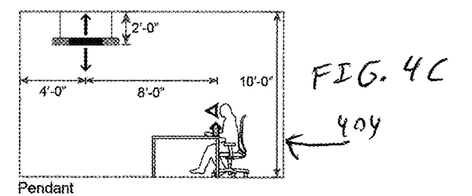
Figure 4D:
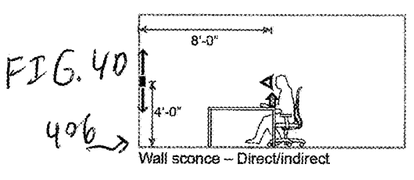
Figure 4E:
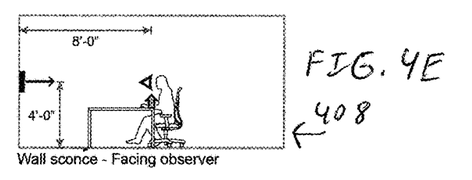
Figure 4F:
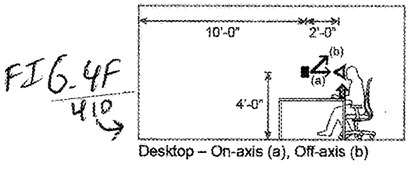
Figure 4G:
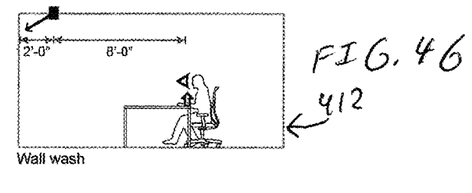

FIGS. 4A-4G illustrate standard configuration rules and luminaire-dependent variables for the major luminaire lines tested and disclosed herein. FIG. 4A illustrates example dimensions of a room 400 and the contents of the room with a standard observer (SO). Various values of reflectance ρ of different portions of the room and contents are shown. The black rectangles or squares in FIGS. 4B-4G represent the luminaires. FIG. 4B illustrates a room 402 with the luminaire recessed in the ceiling. FIG. 4C illustrates a room 404 with a pendant-configured luminaire. FIG. 4D illustrates a room 406 with a luminaire in a wall sconce having direct or indirect illumination. FIG. 4E illustrates a room 408 with a luminaire in a wall sconce and facing the observer. FIG. 4F illustrates a room 410 with a luminaire on a desktop either on-axis (a) or off-axis (b). FIG. 4G illustrates a room 412 with a luminaire illuminating a wall wash. Where present, the black rectangles in FIGS. 4B-4G represent the luminaires' long orientation, and the constituent gray rectangles represent the short luminaires' orientation. The bold black arrows represent the primary direction of light emitted by the luminaires. The term EH is a horizontal illuminance.

The Full Radiosity Method from the known AGi32 lighting calculation software (Version 19.15 Rev. 0-6 May 2020) can be used by the processor 202 to determine vertical illuminance at the plane of the standard observer's eyes that would be provided by each luminaire, taking into account the inter-reflected light in the standard space, as shown in FIGS. 4A-4G. The software uses add-in candela distributions, known as IES files, for both the long and short dimensions of the luminaire. The reflectance values p in the standard space for the ceiling, walls, floor and desk can be, for example, 0.80, 0.50, 0.20, and 0.50, respectively. For the calculations used by the processor 202 to implement the predetermined rules, Adaptive Subdivision can be enabled and set to default (low) levels of three maximum subdivision levels, a minimum element area of 0.50 square feet, and an element luminance threshold of 1.5.

The measure chosen to characterize the potential of a luminaire to provide circadian-effective light is the electrical watts (SOWatt) required for the luminaire to reach the circadian stimulus (CS) criterion such that CS=0.3 for the standard observer (SO). The most circadian-effective combination of luminaire orientation, intensity distribution, and spectral power distribution (SPD) is associated with the fewest watts needed to reach CS=0.3.

To properly represent the amount of light reaching the standard observer, both direct and reflected light need to be quantified. The geometrical configuration of the standard observer's line of sight with respect to the luminaire and the wall described herein realistically combines the potential effectiveness of direct light from the luminaire and that of the indirect light reflected from the ceiling, front wall, and a task surface. Usually, luminaire intensity distributions are not radially symmetric. Depending upon the orientation of the luminaire with respect to the standard observer, more or less light can reach the eyes. Therefore, two electrical watt values are generated for a given luminaire and SPD combination: one where the long dimension of the luminaire is oriented perpendicular to the standard observer's line of sight, and one where the shorter dimension is perpendicular to the standard observer's line of sight. Note that the photometric data in the IES file format (IESNA LM-63-19) do not reference the physical dimensions of the luminaire. Therefore, the short and long designations used here, usually, but not necessarily always, correspond to the IES photometric planes of 0° and 90°, respectively.

Figure 5:
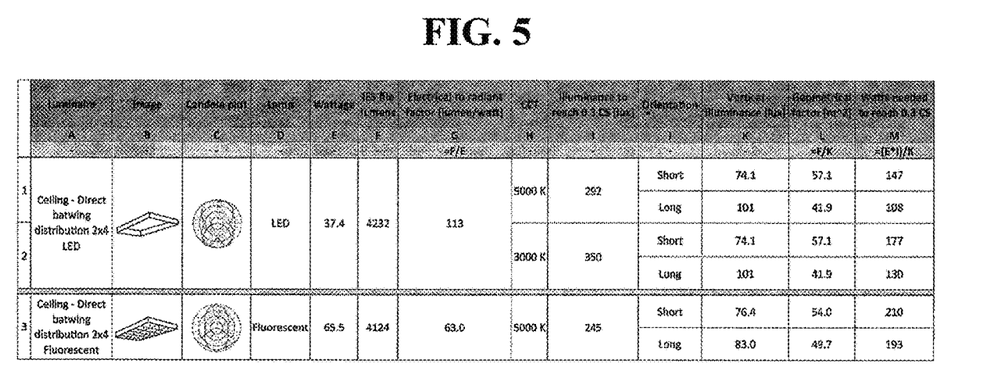
FIG. 5 lists the characteristics for three selected luminaire configurations.

FIG. 5 lists the characteristics for three example selected luminaire configurations and shows how the electrical watts required for each luminaire to reach the circadian stimulus criterion CS=0.3 for the standard observer (SOWatt) are affected by (a) luminaire orientation, (b) the SPD and (c) the luminous efficacy of the light source. For a measurement position, refer to FIGS. 4A-4G and Table 1.

The following describes each column A through M in FIG. 5.

Columns A through H describe the characteristics of the three luminaires.

Column I provides the photopic vertical illuminance (lux) needed by the luminaire's correlated color temperature (CCT) in column H (determined by the specific SPD of the luminaire's light source) to reach a CS=0.3 at the eyes of the standard observer. These values represent the spectral factor for determining SOWatt independent of the luminaire optics.

Column J describes the orientation of the luminaire with respect to the standard observer. The "long" orientation designation means that the longer dimension of the luminaire is perpendicular to the standard observer's line of sight whereas the "short" designation means the shorter dimension is perpendicular to the standard observer.

Column K shows the vertical photopic illuminance (lux) at the standard observer's eyes that the luminaire achieves in a photometric simulation of the standard test configuration.

Column L provides geometrical factors for determining SOWatt independent of the luminaire's spectral power distribution.

Column M provides SOWatt values in Watts. Column M presents the electrical watts required for the luminaire to reach the criterion CS=0.3 (SOWatt), combining the geometrical factor for a given orientation (column L), the spectral factor for a given spectral power distribution (column I), and the luminous efficacy (column G). The lower the geometrical and spectral factors (columns I and L) and the greater the efficacy value (column G), the lower the electrical watts (SOWatt) needed to reach CS=0.3.

Column L can be interpreted as the "geometrical factor" for the luminaire, irrespective of the light source SPD or its luminous efficacy. This factor is in units of square meters ($m^2$), which is not intuitively obvious. In effect, the values in column L represent how effectively the standard observer eye illuminance ($lm/m^2$) utilizes the total luminous flux (lm)

emitted by the luminaire (i.e., lm/lm/m 2=m$^2$). Thus, the fewer the lumens needed to be generated by the luminaire to reach the criterion illuminance at the eyes of the standard observer (column K), the more geometrically efficacious the luminaire. Another way to think about this term is that a more geometrically efficacious luminaire would distribute the amount of flux needed for a CS=0.3 over a smaller area resulting in a higher illuminance.

As can be seen in column I in FIG. 5, two different 5000 K light sources are shown, with a standard light emitting diode (LED) spectral power distribution (SPD) and with a fluorescent, CIE F8 SPD. The two 5000 K light sources require lower photopic illuminance at the standard observer's eyes than the 3000 K light source, such as an LED, to reach CS=0.3. It should be noted that the photopic illuminance values are the same for a given SPD for both orientations of a given luminaire. In this regard, for the same 5000 K CCT ratings, the photopic illuminance values are similar for the LED and fluorescent luminaires, but they are not exactly the same given their different SPD. Thus, the values in column I can be interpreted as "spectral factors" for the luminaires irrespective of the luminaire orientation (column J) or the luminous efficacy of the light source (column G), as shown in FIG. 5.

It should be emphasized that there are innumerable "white" SPDs available, compounded by the fact that luminaire reflectors and refractors may not be spectrally flat. For accurate characterization of the circadian effectiveness of the luminaire, the actual SPD emitted by the luminaire and reaching the eyes must be known. It should be noted that some "tunable" luminaires are designed to be operated in two or more modes. For such luminaires, each mode will have different electrical watt values (SOWatt) needed to reach CS=0.3. Electrical wattage values needed to reach the criterion level of circadian-effective light should be provided for a minimum of two modes, representing the two extreme settings of the "tunable" luminaire.

Finally, columns E and F are used to determine the luminous efficacy of the luminaire (column G). For the examples in FIG. 5, the fluorescent luminaire has a lower luminous efficacy than the LED luminaire for the same CCT and similar optics. Lower luminous efficacy requires greater SOWatt.

In the prior art in the field of automotive efficiency, USEPA organizes automobiles into different "car lines" where each "line" has been designed to meet a different set of customer needs. For example, SUVs are designed to carry a large amount of cargo or number of passengers, whereas compact cars are designed to minimize initial and operational costs. Although every automobile manufacturer has a different offering within a "car line," USEPA enables the public to compare all cars within that "car line" in terms of fuel efficiency. Analogously, in the present system and method, there is a wide variety of "luminaire lines," each designed to accomplish different lighting design goals. Ceiling mounted, recessed downlights are designed to efficiently deliver illuminance to the horizontal task surface, whereas wall-mounted sconces are designed to provide luminous elements within the observer's field of view. Luminaires can include ceiling mounted luminaires, accent luminaires, and table-top luminaires. Luminaires can be organized into different "luminaire lines" for comparison in Table 3 in which the watts needed to reach the CS=0.3 criterion (SOWatt) are provided for the long and short dimensions of the luminaire.

TABLE 2

| Luminaire line | Sample size (n) | Wattage needed to reach CS = 0.3 | | |
|---|---|---|---|---|
| | | Highest (W) | Lowest (W) | Average (W) |
| Ceiling - Direct cosine distribution | 26 | 256 | 103 | 148 |
| Ceiling - Direct batwing distribution | 8 | 177 | 102 | 140 |
| Ceiling - Direct asymmetric distribution | 4 | 378 | 97.3 | 223 |
| Ceiling - Direct wide distribution | 10 | 348 | 114 | 236 |
| Ceiling - Direct narrow distribution | 18 | 5800 | 142 | 950 |
| Ceiling - Direct pendant | 8 | 521 | 174 | 247 |
| Ceiling - Direct/indirect pendant | 50 | 628 | 122 | 193 |
| Ceiling - Linear recessed wall wash | 4 | 641 | 176 | 340 |
| Ceiling - Downlight wall wash | 4 | 8750 | 275 | 2486 |
| Wall - Sconce facing observer | 3 | 69.6 | 48.9 | 57.9 |
| Wall - Direct/indirect sconce | 7 | 341 | 126 | 184 |
| Desktop - On-axis luminaire | 4 | 9.9 | 1.8 | 5.9 |
| Desktop - Off-axis luminaire | 4 | 33.2 | 4.8 | 21.3 |

Table 2 shows, without regard to orientation, the highest, lowest, and average values of SOWatt for different luminaire lines. Table 3 below describes the luminaire lines.

TABLE 3

| Label | Orientation | Watts needed to reach 0.3 CS (SOWatt) |
|---|---|---|
| Ceiling - Direct cosine distribution | | |
| COS 07 | Long | 103.4 |
| COS 01 | Long | 107.1 |
| COS 10c | Short | 118.3 |
| COS 03 | Long | 119.0 |
| COS 07 | Short | 120.5 |
| COS 10c | Long | 123.4 |
| COS 10b | Short | 123.6 |
| COS 02 | Short | 123.7 |
| COS 08b | Short | 125.7 |
| COS 10b | Long | 125.9 |
| COS 02 | Long | 127.5 |
| COS 04 | Short | 127.7 |
| COS 01 | Short | 128.0 |
| COS 08a | Short | 138.0 |
| COS 06 | Short | 140.7 |
| COS 03 | Short | 141.7 |
| COS 08b | Long | 142.3 |
| COS 10a | Short | 147.5 |
| COS 10a | Long | 148.5 |
| COS 08a | Long | 154.3 |
| COS 04 | Long | 166.9 |
| COS 05 | Short | 187.2 |
| COS 05 | Long | 190.7 |
| COS 06 | Long | 203.1 |
| COS 09 | Long | 255.1 |
| COS 09 | Short | 255.5 |
| Ceiling - Direct batwing distribution | | |
| BAT 02 | Short | 101.9 |
| BAT 02 | Long | 106.9 |
| BAT 04 | Long | 129.7 |
| BAT 01 | Long | 132.8 |
| BAT 03 | Long | 135.0 |
| BAT 01 | Short | 165.1 |
| BAT 03 | Short | 170.6 |
| BAT 04 | Short | 176.8 |
| Ceiling - Direct asymmetric distribution | | |
| ASYM 01 | Short | 97.3 |
| ASYM 01 | Long | 180.6 |
| ASYM 02 | Short | 236.5 |
| ASYM 02 | Long | 378.5 |

TABLE 3-continued

| Label | Orientation | Watts needed to reach 0.3 CS (SOWatt) |
|---|---|---|
| Ceiling - Direct wide distribution | | |
| WIDE 03 | Long | 114.4 |
| WIDE 03 | Short | 125.9 |
| WIDE 05 | Short | 205.8 |
| WIDE 05 | Long | 206.3 |
| WIDE 04 | Short | 214.2 |
| WIDE 04 | Long | 218.6 |
| WIDE 01 | Long | 276.2 |
| WIDE 01 | Short | 300.1 |
| WIDE 02 | Short | 346.7 |
| WIDE 02 | Long | 348.3 |
| Ceiling - Direct narrow distribution | | |
| NAR 06 | Short | 142.2 |
| NAR 05 | Short | 146.2 |
| NAR 02 | Short | 160.2 |
| NAR 06 | Long | 175.0 |
| NAR 05 | Long | 182.6 |
| NAR 03 | Short | 206.6 |
| NAR 03 | Long | 206.6 |
| NAR 02 | Long | 214.7 |
| NAR 04 | Long | 259.6 |
| NAR 04 | Short | 266.9 |
| NAR 09a | Short | 359.2 |
| NAR 09a | Long | 361.3 |
| NAR 08 | Short | 863.0 |
| NAR 08 | Long | 877.3 |
| NAR 01 | Short | 892.1 |
| NAR 01 | Long | 914.4 |
| NAR 07 | Long | 5075.0 |
| NAR 07 | Short | 5800.0 |
| Ceiling - Direct pendant | | |
| Direct 03 | Short | 174.4 |
| Direct 03 | Long | 189.3 |
| Direct 04 | Short | 201.9 |
| Direct 04 | Long | 205.0 |
| Direct 02 | Short | 206.0 |
| Direct 01 | Long | 236.0 |
| Direct 02 | Long | 242.2 |
| Direct 01 | Short | 521.4 |
| Ceiling - Direct/indirect pendant | | |
| D/I 10 | Long | 121.7 |
| D/I 04 | Long | 132.9 |
| D/I 05 | Long | 138.6 |
| D/I 11 | Long | 138.8 |
| D/I 17 | Short | 147.9 |
| D/I 17 | Long | 147.9 |
| D/I 06c | Short | 148.9 |
| D/I 06b | Short | 151.7 |
| D/I 11 | Short | 151.8 |
| D/I 15a | Long | 157.7 |
| D/I 15e | Short | 158.1 |
| D/I 06b | Long | 158.7 |
| D/I 15a | Short | 159.6 |
| D/I 08 | Short | 160.5 |
| D/I 09 | Short | 162.3 |
| D/I 06c | Long | 162.8 |
| D/I 15c | Short | 163.6 |
| D/I 15b | Long | 164.4 |
| D/I 04 | Short | 164.7 |
| D/I 16 | Short | 165.3 |
| D/I 15c | Long | 165.6 |
| D/I 10 | Short | 166.8 |
| D/I 15d | Short | 168.1 |
| D/I 15d | Long | 168.1 |
| D/I 06a | Short | 168.7 |
| D/I 12a | Short | 169.2 |
| D/I 12b | Short | 170.0 |
| D/I 06a | Long | 170.7 |
| D/I 08 | Long | 172.7 |
| D/I 15b | Short | 172.9 |
| D/I 12b | Long | 176.0 |
| D/I 16 | Long | 178.6 |
| D/I 09 | Long | 180.6 |
| D/I 15e | Long | 181.9 |
| D/I 02a | Long | 182.0 |
| D/I 12a | Long | 182.5 |
| D/I 07 | Long | 183.2 |
| D/I 02a | Short | 188.7 |
| D/I 13 | Short | 194.4 |
| D/I 07 | Short | 201.8 |
| D/I 02b | Long | 208.5 |
| D/I 03 | Short | 213.9 |
| D/I 03 | Long | 225.6 |
| D/I 02b | Short | 226.5 |
| D/I 13 | Long | 240.2 |
| D/I 01 | Long | 260.6 |
| D/I 01 | Short | 264.9 |
| D/I 05 | Short | 277.2 |
| D/I 14 | Short | 483.3 |
| D/I 14 | Long | 628.2 |
| Ceiling - Linear recessed wall wash | | |
| Linear recessed 02 | Long | 176.1 |
| Linear recessed 03 | Long | 219.3 |
| Linear recessed 01a | Long | 323.9 |
| Linear recessed 01a | Long | 641.3 |
| Ceiling - Downlight wall wash | | |
| DN 02b | n/a | 274.5 |
| DN 02a | n/a | 303.8 |
| DN 02c | n/a | 615.6 |
| DN 01 | n/a | 8750.0 |
| Wall - Sconce facing observer | | |
| Facing 03 | Long | 48.9 |
| Facing 01 | Long | 55.4 |
| Facing 02 | Long | 69.6 |
| Wall - Direct/indirect sconce | | |
| D-I 01 | Long | 162.9 |
| D-I 02a | Long | 126.0 |
| D-I 03b | Long | 145.1 |
| D-I 02c | Long | 149.9 |
| D-I 03a | Long | 176.8 |
| D-I 02b | Long | 189.6 |
| D-I 04 | Long | 341.0 |
| Desktop - On axis luminaire | | |
| Linear 01b | Short | 1.8 |
| Linear 01b | Long | 1.8 |
| Linear 01a | Short | 9.9 |
| Linear 01a | Long | 9.9 |
| Desktop - Off axis luminaire | | |
| Linear 02b | Vertical | 4.8 |
| Linear 02a | Vertical | 15.3 |
| Bulb + shade 01 | Vertical | 32.1 |
| Bulb + shade 02 | Vertical | 33.2 |

It should be no surprise that the "desktop" luminaire line is the most efficient luminaire line, having a lowest average SOWatt value, because of their proximity to the standard observer. In contrast, the ceiling downlight wall wash luminaire line is the least efficient, with a highest average SOWatt value. Importantly however, there is a wide range of SOWatt values within every luminaire line and, moreover, there is overlap between luminaire lines. Therefore, nearly any luminaire type can provide circadian-effective light to occupants if applied correctly, so lighting professionals are not necessarily restricted to a single luminaire type to support circadian entrainment.

Figure 6:
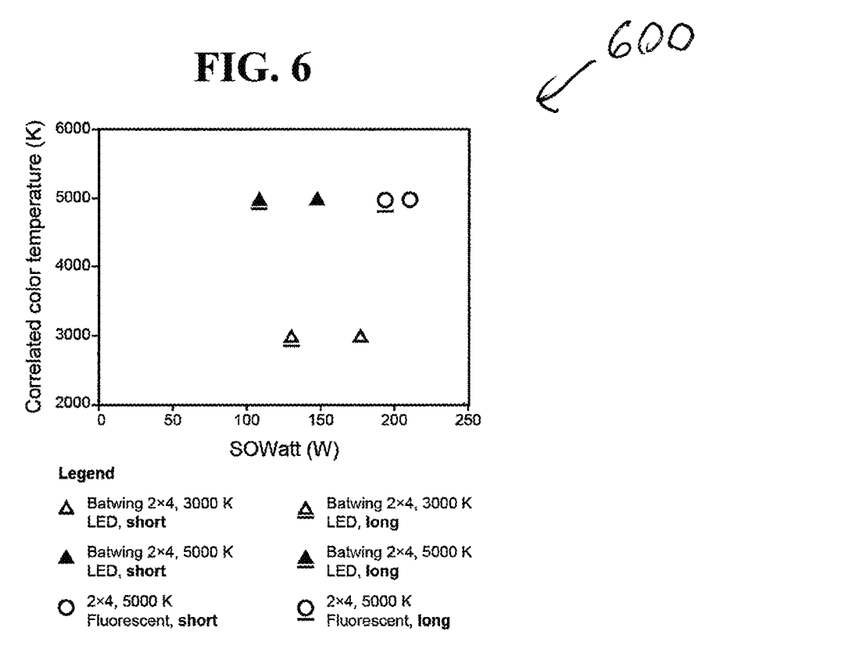
FIG. 6 shows a comparison between correlated color temperature (CCT) and wattage.

Similarly, lighting professionals are not restricted to a particular CCT. FIG. 6 shows a graph 600 providing a comparison between CCT and wattage needed to reach a CS equal to 0.3. FIG. 6 also shows a great deal of overlap between SOWatt values for the 3000 K and 5000 K luminaires in FIG. 5.

Figure 7:
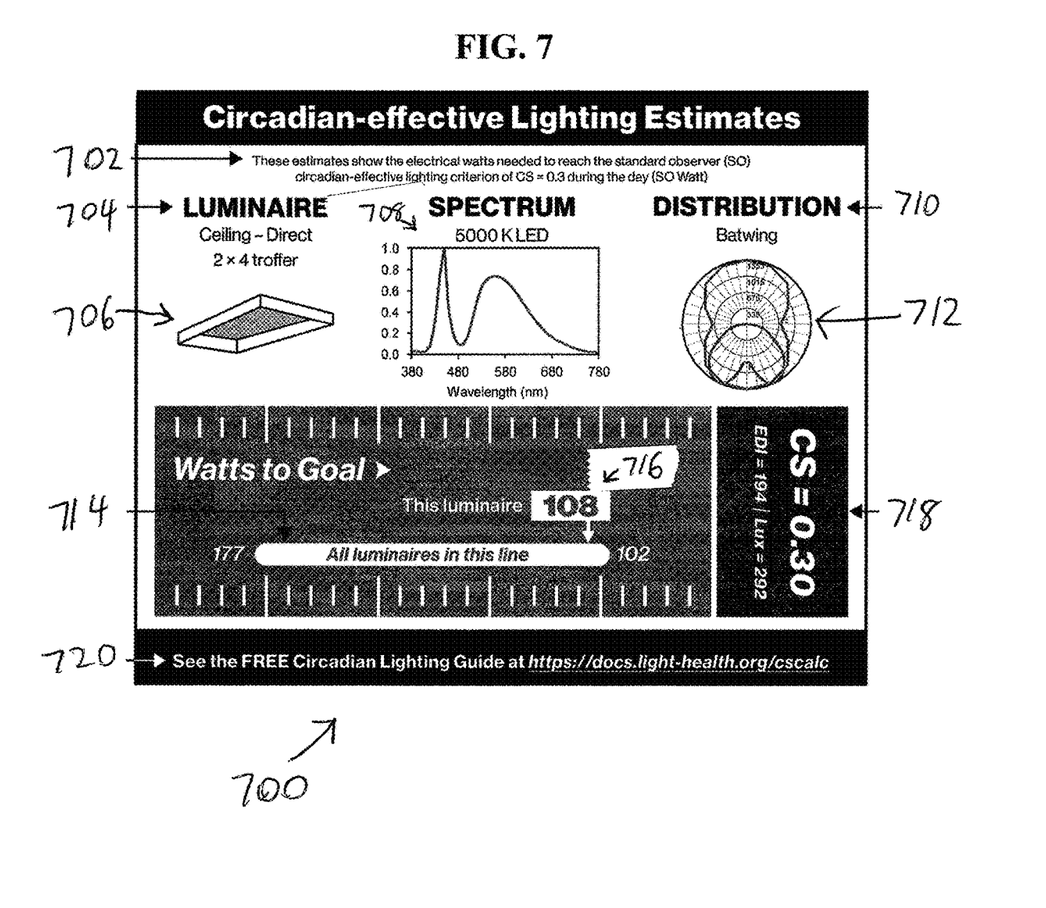
FIG. 7 is an example efficiency graphic for a luminaire according to the embodiment.

FIG. 7 is an example of a SOWatt graphic 700 which can be generated by step 308 and output by step 310 of the method 300 of FIG. 3. The SOWatt graphic 700 emulates the well-recognized and well-accepted USEPA car fuel economy label in the prior art, with an example car fuel economy label 100 shown FIG. 1. The SOWatt graphic 700 is designed to capture in a familiar and simple graphic form the results of luminaire testing for providing circadian-effective light. All luminaries can be measured in terms of SOWatt values, as the electrical watts needed to reach a daytime criterion level of circadian stimulus (CS) such as CS=0.3 as employed in UL 24480 and developed by the Light and Health Research Center at Mount Sinai School of Medicine (formerly the Lighting Research Center at Rensselaer Polytechnic Institute).

As shown in FIG. 7, the example SOWatt graphic 700 for circadian-effective lighting estimates includes keyed elements as follows: information 702 about the label's meaning; a listing 704 of the illustrated "luminaire line" (Ceiling-Direct) and type (2×4 troffer) with a graphical representation 706 of the form factor of the luminaire; the CCT and the relative spectral power distribution 708 of the light source; the type of distribution 710 and a polar plot 712 of the luminaire's candela distribution in both the vertical and horizontal planes; the range 714 of wattages needed to meet the criterion value of CS=0.3 of all luminaires in the same "luminaire line"; the wattage 716 needed by this luminaire to meet CS=0.3 and how the wattage 716 compares to others in the same "luminaire line"; the circadian-effective lighting criterion value 718 of CS=0.3 and the associated melanopic equivalent daylight illuminance (EDI) and photopic illuminance required to reach the target CS value; and information 720 of a website providing more information on the science behind the CS metric.

Figure 8:
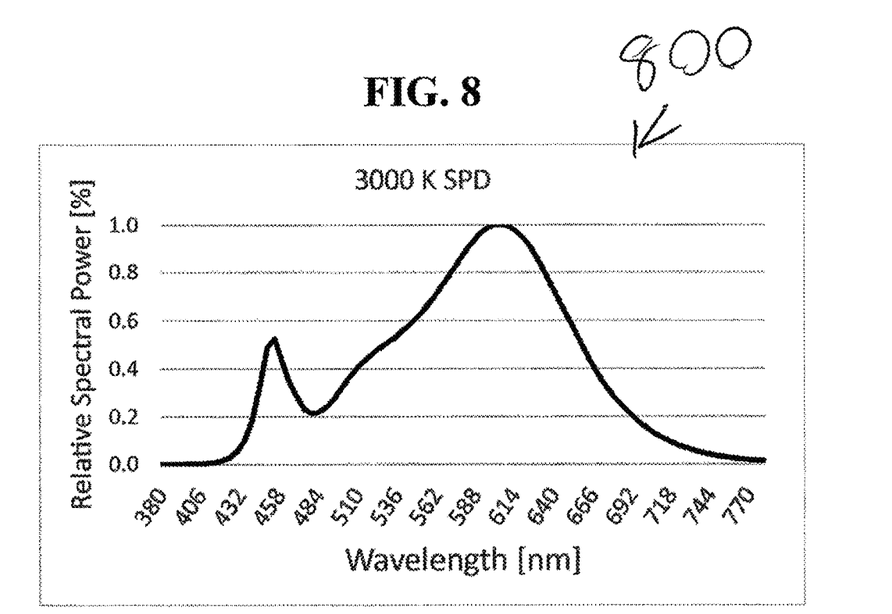
FIG. 8 illustrates a relative spectral power distribution (SPD).

The wattage values for each luminaire can be supplied by the manufacturer of each luminaire or line of luminaires. A single SPD can be chosen for all CS calculations, such as for 3000 K LED, and a relative SPD 800 is shown in FIG. 8. The vertical illuminance needed by every luminaire with the reference SPD needed to provide CS=0.3 is 350 lux. In the calculations of SOWatt performed by the processor 202, the luminaire wattage is multiplied by the ratio of the vertical illuminance needed to reach CS=0.3 divided by the vertical illuminance that would be provided, which results in the determined SOWatt value.

Portions of the methods described herein can be performed by software or firmware in machine readable form on a tangible (e.g., non-transitory) storage medium. For example, the software or firmware can be in the form of a computer program including computer program code adapted to cause the system to perform various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:
1. A method, comprising:
receiving configuration data for a luminaire;
applying a predetermined rule to the configuration data by a computer-based processor;
determining an effective lighting value of the luminaire using the computer-based processor, wherein the effective lighting value is a circadian-effective lighting wattage of the luminaire that provides a criterion level of circadian-effective lighting that is determined by a test procedure; and
outputting the effective lighting value.

2. The method of claim 1, wherein the circadian-effective lighting wattage (SOWatt) induces a circadian stimulus (CS) at the eyes of a standard observer (SO) relative to the luminaire.

3. The method of claim 2, wherein the CS equals 0.3.

4. The method of claim 1, wherein outputting the effective lighting value includes displaying the effective lighting value on a display device.

5. The method of claim 4, wherein the displaying of the effective lighting value includes displaying a graphic listing the effective lighting value.

6. The method of claim 1, wherein outputting the effective lighting value includes printing a graphic label listing the effective lighting value.

7. The method of claim 1, wherein the luminaire is selected from the group consisting of: a ceiling mounted luminaire, an accent luminaire, and a table-top luminaire.

8. A method, comprising:
receiving configuration data for a luminaire;
applying a predetermined rule to the configuration data by a computer-based processor;
determining a circadian-effective lighting wattage (SOWatt) of the luminaire using the computer-based processor, wherein the circadian-effective lighting wattage induces a circadian stimulus (CS) during daytime at the eyes of a standard observer (SO) relative to the luminaire, wherein the circadian-effective lighting wattage provides a criterion level of circadian-effective lighting that is determined by a test procedure; and
displaying the circadian-effective lighting wattage.

9. The method of claim 8, wherein the CS equals 0.3.

10. The method of claim 8, wherein displaying the circadian-effective lighting wattage includes displaying a graphic on a display device, wherein the graphic lists the circadian-effective lighting wattage.

11. The method of claim 8, wherein displaying the circadian-effective lighting wattage includes printing a graphic label listing the circadian-effective lighting wattage.

12. The method of claim 8, wherein the luminaire is selected from the group consisting of: a ceiling mounted luminaire, an accent luminaire, and a table-top luminaire.

13. A system, comprising:
an interface configured to receive configuration data for a luminaire; and
a computer-based processor having code therein configured to apply a predetermined rule to the configuration data and to determine an effective lighting value of the luminaire, wherein the effective lighting value is a circadian-effective lighting wattage of the luminaire that provides a criterion level of circadian-effective lighting that is determined by a test procedure,
wherein the interface is configured to output the effective lighting value.

14. The system of claim 13, wherein the circadian-effective lighting wattage (SOWatt) induces a circadian stimulus (CS) at the eyes of a standard observer (SO) relative to the luminaire.

15. The system of claim 14, wherein the CS equals 0.3.

16. The system of claim 13, wherein the interface includes a display device configured to display the effective lighting value.

17. The system of claim 16, wherein the interface displays a graphic listing the effective lighting value.

18. The system of claim 13, wherein the interface includes a printer configured to print a graphic label listing the effective lighting value.

* * * * *